US011593704B1

United States Patent
Jenatton et al.

(10) Patent No.: US 11,593,704 B1
(45) Date of Patent: Feb. 28, 2023

(54) AUTOMATIC DETERMINATION OF HYPERPARAMETERS

(71) Applicant: Amazon Technologies, Inc., Seattle, WA (US)

(72) Inventors: Rodolphe Jenatton, Berlin (DE); Miroslav Miladinovic, Berlin (DE); Valerio Perrone, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 916 days.

(21) Appl. No.: 16/455,356

(22) Filed: Jun. 27, 2019

(51) Int. Cl.
*G06N 20/00* (2019.01)
*G06N 3/08* (2006.01)
*G06N 7/00* (2006.01)
*G06N 7/02* (2006.01)
*G06F 16/2455* (2019.01)

(52) U.S. Cl.
CPC ......... *G06N 20/00* (2019.01); *G06F 16/2455* (2019.01); *G06N 3/08* (2013.01); *G06N 7/005* (2013.01); *G06N 7/023* (2013.01)

(58) Field of Classification Search
CPC .......... G06N 20/00; G06N 3/08; G06N 7/005; G06N 7/023
See application file for complete search history.

(56) References Cited

U.S. PATENT DOCUMENTS

| | | | |
|---|---|---|---|
| 2011/0213587 A1* | 9/2011 | Lu | G06F 30/3323 702/181 |
| 2016/0110657 A1* | 4/2016 | Gibiansky | G06N 20/00 706/12 |
| 2018/0349158 A1* | 12/2018 | Swersky | G06N 3/0472 |

OTHER PUBLICATIONS

Wistuba, Martin et al. "Hyperparameter Search Space Pruning—A New Component for Sequential Model-Based Hyperparameter Optimization". Springer, ECML PKDD 2015 [Published 2015] [Retrieved Jul. 2022] DOI: 10.1007/978-3-319-23525-7 7 (Year: 2015).*
Matthias Poloczek, Jialei Wang, and Peter I. Frazier. 2016. Warm starting Bayesian optimization. In Proceedings of the 2016 Winter Simulation Conference (WSC '16). IEEE Press, 770-781. (Year: 2016).*
Bergstra, James et al. "Random Search for Hyper-Parameter Optimization" JMLR vol. 13 pp. 281-305 [Published 2012] [Retrieved Jul. 2022] <URL: https://www.jmlr.org/papers/volume13/bergstra12a/bergstra12a.pdf> (Year: 2012).*

(Continued)

*Primary Examiner* — Ann J Lo
*Assistant Examiner* — Fen Christopher Tamulonis
(74) *Attorney, Agent, or Firm* — Nicholson De Vos Webster & Elliott LLP

(57) ABSTRACT

Techniques for tuning a machine learning algorithm using automatically determined optimal hyperparameters are described. An exemplary method includes receiving a request to determine a search space for at least one hyperparameter of a machine learning algorithm; determining, according to the request, optimal hyperparameter values from the search space for at least the one hyperparameter of the machine learning algorithm based on an evaluation of hyperparameters from the same machine learning algorithm on different datasets; and tuning the machine learning algorithm using the determined optimal hyperparameter values for the at least one hyperparameter of the machine learning algorithm to generate a machine learning model.

18 Claims, 14 Drawing Sheets

(56) References Cited

OTHER PUBLICATIONS

Tromba, Isabella M. "MakeML: automated machine learning from data to predictions" MIT Thesis [Published 2018] [Retrieved Jul. 2022] http://hdl.handle.net/1721.1/119705 (Year: 2018).*

M. T. Young, J. Hinkle, A. Ramanathan and R. Kannan, "HyperSpace: Distributed Bayesian Hyperparameter Optimization," 2018 30th International Symposium on Computer Architecture and High Performance Computing (SBAC-PAD), 2018, pp. 339-347, doi: 10.1109/CAHPC.2018.8645954. (Year: 2018).*

A. Anderson, S. Dubois, A. Cuesta-infante and K. Veeramachaneni, "Sample, Estimate, Tune: Scaling Bayesian Auto-Tuning of Data Science Pipelines," 2017 IEEE International Conference on Data Science and Advanced Analytics (DSAA), 2017, pp. 361-372 , doi: 10.1109/DSAA.2017.82. (Year: 2017).*

Patrick Koch, Oleg Golovidov, Steven Gardner, Brett Wujek, Joshua Griffin, and Yan Xu. 2018. Autotune: A Derivative-free Optimization Framework for Hyperparameter Tuning. (KDD '18). Association for Computing Machinery, New York, NY, USA, 443-452. https://doi.org/10.1145/3219819.3219837 (Year: 2018).*

Adolfs, Leonard, Non Convex-Concave Saddle Point Optimization, Apr. 9, 2018, Master Thesis, ETH Zurich, 84 pages.

Bertsimas, Dimitris et al., Theory and Applications of Robust Optimization, SIAM Review, 2011, pp. 464-501, vol. 53 / No. 3.

Henning, Philipp and Schuler, Christian J., Entropy Search for Information-Efficient Global Optimization, Journal of Machine Learning Research, Jun. 2012, pp. 1809-1837, vol. 13.

Hutter, Frank et al., An Efficient Approach for Assessing Hyperparameter Importance, Proceedings of the 31st International Conference on Machine Learning (ICML-14), 2014, pp. 754-762 (9 pages), vol. 32.

Jones, Donald R., et al., Efficient Global Optimization of Expensive Black-Box Functions, Journal of Global Optimization, 1998, pp. 455-492, vol. 13.

Perrone, Valerio et al.,, Scalable Hyperparameter Transfer Learning, 32nd Conference on Neural Information Processing System (NIPS), Montreal, Canada; 2018, 11 pages.

Probst, Philipp, et al., Tunability: Importance of Hyperparameters of Machine Learning Algorithms, Journal of Machine Learning Research 20; 2019, pp. 1-32.

Shahriari, Bobak et al., Taking the Human Out of the Loop: A Review of Bayesian Optimization, Proceedings of the IEEE, 104(1); 2016, 24 pgs.

Shahriari, Bobak et al., Unbounded Bayesian Optimization via Regularization, Proceedings of the International Conference on Artificial Intelligence and Statistics (AISTATS); 2016, pp. 1168-1176.

Snoek, Jasper et al., Scalable Bayesian Optimization Using Deep Neural Networks, Proceedings of the International Conference on Machine Learning (ICML); 2015, (13 pgs.).

Van Rijn, Jan N., et al., Hyperparameter Importance Across Datasets, Proceedings of the 24th ACM SIGKDD Int'l Conference on Knowledge Discovery & Data Mining; 2018, 10 pages.

Xu, Huan et al., Robust Regression and Lasso, Advances in Neural Information Processing Systems (NIPS); 2009, 8 pages., https://papers.nips.cc/paper/2008/file/24681928425f5a9133504de568f5f6df-Paper.pdf.

* cited by examiner

```
tuning_job_config = {
  "ParameterRanges": {
    "CategoricalParameterRanges": [],
    "ContinuousParameterRanges": [
      {
        "MaxValue": "1",
        "MinValue": "0",          ⎫ 501
        "Name": "eta"
      },
      {
        "MaxValue": "2",
        "MinValue": "0",
        "Name": "alpha"
      },
      {
        "MaxValue": "10",
        "MinValue": "1",
        "Name": "min_child_weight"
      }
    ],
    "IntegerParameterRanges": [
      {
        "MaxValue": "NULL",
        "MinValue": "NULL",       ⎫ 503
        "Name": "max_depth"
      }
    ]
  },
  "ResourceLimits": {
    "MaxNumberOfTrainingJobs": 20,
    "MaxParallelTrainingJobs": 3
  },
  "Strategy": "Bayesian",
  "HyperParameterTuningJobObjective": {
    "MetricName": "validation:auc",        505
    "Type": "Maximize"
  }
}
```

*FIG. 6*

AUTOMATIC DETERMINATION OF HYPERPARAMETERS

BACKGROUND

Bayesian optimization has become over the past few years a key and successful methodology to automatically tune the hyper-parameters (HPs) (such as the number of layers in deep learning architectures, the learning rates of gradient-based procedures or the number of trees in ensemble methods, etc.) of machine learning systems.

There are two core ingredients required to apply Bayesian optimization: (1) a machine learning system that outputs some metric of interest, e.g., the classification accuracy, while being fed with some input HPs and (2) the definition of the optimization domain, also referred to as the search space, where the HPs can be selected. The search space is typically defined via sets of choices for categorical HPs and ranges for numerical HPs (i.e., as encoded by the minimum and maximum values that can be taken). In practice, defining the search space is a difficult exercise that (a) usually rests on the shoulders of the machine-learning system owner and (b) needs to be adjusted according to the data and application at hand.

BRIEF DESCRIPTION OF DRAWINGS

Various embodiments in accordance with the present disclosure will be described with reference to the drawings, in which:

FIG. 6 illustrates an example of a portion of tuning job configuration.

DETAILED DESCRIPTION

Figure 1:
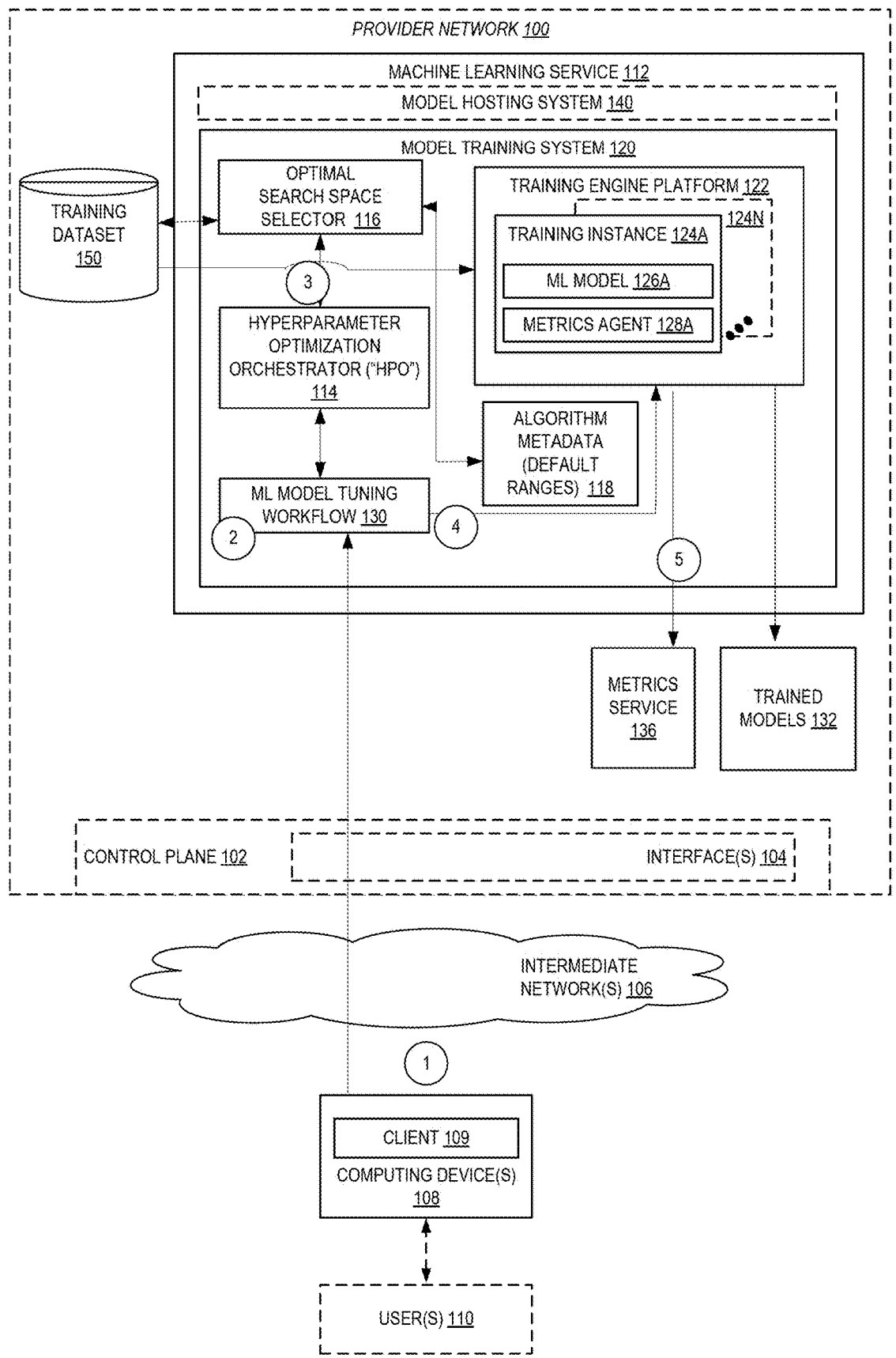
FIG. 1 is a diagram illustrating an environment for finding optimal search spaces and ML model tuning according to some embodiments.

The present disclosure relates to methods, apparatus, systems, and non-transitory computer-readable storage media for automatically determining optimal hyperparameter values (e g, minimum and maximum range values) for one or more hyperparameters of a machine learning algorithm to be used in training a machine learning model. A search space may include ranges, a countable set, etc.

Tuning the hyperparameters (HPs) of machine leaning (ML) models and in particular deep neural networks is critical for achieving good predictive performances. Unfortunately, the mapping of the HPs to the prediction error is in general a black-box in the sense that, neither its analytical form, nor its gradients are available. Moreover, every (noisy) evaluation of this black-box is time-consuming as it requires retraining the model from scratch. Bayesian optimization (BO) provides a principled approach to this problem: an acquisition function, which takes as input a cheap probabilistic surrogate model of the target black-box function, repeatedly scores promising HP configurations by performing an explore-exploit trade-off. The surrogate model is built from the set of black-box function evaluations observed so far. For example, a popular approach is to impose a Gaussian process (GP) prior on the unobserved target black-box function $f(x)$. Based on a set of evaluations $\{f(x^i)\}^n_{i=1}$, possibly perturbed by Gaussian noise, one can compute the posterior GP, which is characterized by a posterior mean function and a posterior (co)variance function. Next query points are selected by optimizing an acquisition function, such as the expected improvement, which is analytically tractable given these two quantities. While BO takes the human out of the loop in ML by automating HP optimization (HPO), it still requires the user to define a suitable search space a priori.

Unfortunately, defining a default search space for a particular ML problem is difficult and is typically left to human experts. Detailed herein are embodiments that automatically define the search space, which is a critical input to any BO procedure applied to hyperparameter optimization, based on historical and/or user defined data. As problems occurring in ML are often related (for example, tuning the HPs of an ML model trained on different data sets) the learnings from historical data may be leverage in the selection of optimal search space and/or HP values (e.g., minimum and maximum values).

In particular, detailed herein are embodiments of automatically determining an optimal HP for at least one HP. This determination may be based on access to logged data for previous Bayesian optimization runs obtained over similar tasks (such as the same machine learning system applied over different datasets). As such, this approach tries to apply transfer learning ideas to automatically determine a search space. The "problem" to solve of determining good and robust search space (i.e., that will work well on unseen datasets) is a numerical optimization procedure where the compactness of the search space can be adjusted based on a user-defined parameter (such as a shape of a boundary condition). Further, this approach is agnostic to the Bayesian optimization technique that is subsequently applied to determine optimal HP values. Note that in some instances when the shape is an hyper-ellipsoidal representation this is not only simple to compute and manipulate, but leads to faster black-box optimization, especially as the dimension of the search space increases.

FIG. 1 is a diagram illustrating an environment for finding optimal search spaces and ML model tuning according to some embodiments. FIG. 1 includes a model training system 120 that may be implemented as part of a machine learning service 112 provided by a provider network 100. The model training system 120 may be implemented using software, hardware, or a combination of both.

A provider network 100 provides users (e.g., user(s) 110) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a machine learning service 112 that can train and/or host machine learning models, etc. The users (or "customers") of provider networks 100 may utilize one or more user accounts that are associated with a customer account, though these terms may be used somewhat interchangeably depending upon the context of use. Users may interact with a provider network 100—via use of a client 109 executed by a computing device 108—across one or more intermediate networks 106 (e.g., the internal via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, the model training system 120 trains ML models. For example, the model training system 120 may be a component of a machine learning service 112 that receives requests to train models and utilizes the model training system 120 to instrument this training. Moreover, the model training system 120 may be utilized to perform ML model tuning jobs (also referred to as model parameter tuning jobs), running different ML training jobs with many different combinations of hyperparameters to seek which set produces a "best" resultant model. When each training is completed an accuracy score for each resultant model can be analyzed to detect which training run resulted in the highest accuracy model, which can then be recommended for use to a client, hosted and run via a model hosting system 140, stored in a storage location of a storage service for later use, etc. Thus, the model training system 120 may select different sets of hyperparameters and run different trainings via a training engine platform 122 and then choose the hyperparameter values that result in a model that performs the best, as measured by a metric that you choose.

For example, suppose that you want to solve a binary classification problem on a marketing dataset with the goal to maximize the area under the curve (auc) metric of the algorithm by training an XGBoost algorithm model. However, which values of the eta, alpha, min_child_weight, and max_depth hyperparameters to use to train the best model are not known. Embodiments herein may be utilized to first find a search space and optimal HP values for the ML model tuning workflow 130 to use to find the combination of values that results in a plurality training jobs that perform the best as measured by the objective metric that was chosen. Note that the ML model tuning workflow 130 may be used with built-in algorithms, custom algorithms, and/or pre-built containers for machine learning frameworks.

When choosing the best hyperparameters for the next training job, the ML model tuning workflow 130 considers everything that it knows about this problem so far. Sometimes it chooses a combination of hyperparameter values close to the combination that resulted in the best previous training job to incrementally improve performance. This allows hyperparameter tuning to exploit the best-known results. Other times, it chooses a set of hyperparameter values far removed from those it has tried. This allows it to explore the optimal HP values of hyperparameter values to try to find new areas that are not well understood.

For example, a user 110 may utilize or configure an application (e.g., client 109, such as a web browser executing a web application, a standalone application) executed by a computing device 108 to send one or more requests, at circle (1), to a machine learning service 112 to configure and execute a model tuning job. The one or more requests may be sent responsive to the user 110 having utilized a graphical user interface (GUI), console, or the like to configure an ML model tuning job by specifying, for example, a particular type of ML algorithm to be used, what training data to use, and the like. The user 110 may also have selected a user interface element (e.g., a checkbox or similar) or configured a data structure to indicate that the machine learning service 112 is to determine one or more optimal HP values from a search space of hyperparameters of an ML algorithm. As a result, a request may include a NULL value (e.g., a value of a hyperparameter field in a tuning job configuration data structure) that indicates to the machine learning service 112 that it is to look for maximum and minimum optimal HP values to be used in training.

In some embodiments, the request includes several parameters including one or more of: the ML algorithm to train, the shape to use for the search space (e.g., hyper-rectangle or hyper-ellipsoid), an objective metric to use, hyperparameter ranges (or a NULL value when these are to be determined), resource limits, and a strategy of how the ML model tuning workflow 130 is to choose the combinations of hyperparameter values to use for the training job it launches, etc. Examples of strategies include, but are not limited to: Bayesian and random. For a random search, the ML model tuning workflow 130 chooses a random combination of values from within the ranges specified for hyperparameters for each training job it launches. Bayesian search treats hyperparameter tuning like a regression problem. Given a set of input features (the hyperparameters), hyperparameter tuning optimizes a model for the chosen metric. To solve a regression problem, hyperparameter tuning makes guesses about which hyperparameter combinations are likely to get the best results and runs training jobs to test these values. After testing the first set of hyperparameter values, hyperparameter tuning uses regression to choose the next set of hyperparameter values to test.

Responsive to the one or more requests, the machine learning service 112 may cause a ML model tuning workflow 130 of the model training system 120 at circle (2) to begin executing the tuning job. For example, the model training system 120 may instruct a hyperparameter optimization orchestrator 114 ("HPO") component, which may be implemented using software executed by one or multiple computing devices, to begin and orchestrate the tuning job and determine which hyperparameters to adjust using a recommendation engine.

Thereafter, the HPO 114 may call an optimal search space selector engine 116 at circle (3) to ask for one or more sets of recommended optimal HP values to test. The optimal search space selector 116 can be implemented to utilize one or more of various techniques to identify different optimal search spaces to test, such as by obtaining previous sets of hyperparameters (noted as X* below) that were found to be useful for previous similar tuning or training jobs from algorithm metadata (e.g., default ranges) 118 (discussed in more detail with respect to FIG. 2 with respect to offline optimal search space selector 203 and reference dataset(s) 205) and/or merged with a user training dataset 150 containing previous evaluations. Note in a provider network 100 scenario, the training dataset 150 is confined to a particular use.

Once the optimal search spaces are found the HPO 114 and/or optimal search space selector 116 may randomly select hyperparameter values (optionally subject to constraints specified by the request, such as a range of values to search within/between for particular hyperparameters), adjusting certain hyperparameters in various ways (e.g., increasing or decreasing one or more hyperparameter values by some amount, or drawing samples uniformly at random) to attempt to determine how certain changes result in different results, etc. Accordingly, the optimal search space selector 116 may provide at least a first set of an optimal search spaces of hyperparameters for use to the HPO 114, which may then issue a command to a training engine platform 122 at circle (4) to begin one or multiple training jobs as part of the tuning utilizing the set(s) of hyperparameters. The training engine platform 122 may then utilize commands (e.g., issue various API calls to components or services) to run the one or more training jobs using one or more training instances 124A-124N. For example, the training engine platform 122 may be caused to run one or more training instances 124A-124N, each working to train a ML model 126A by utilizing training data with a ML algorithm according to the set of hyperparameters for the particular training job.

During each training job, each training instance 124A may implement a metrics agent 128A that generates and emits metrics including an objective metric value pertaining to the status of the training job at circle (5). An objective metric value may be, for example, a metric that reveals a quality of the current model or of the training—e.g., a prediction accuracy, a training error, etc. The metrics agent 128A may emit these metrics, for example, at the conclusion of each training step of the training job. The metrics may be emitted in a variety of ways, such as via sending messages including the metrics to one or more destinations (e.g., directly to the HPO 114, by writing metrics to a data stream (e.g., provided by a real-time data streaming service of the provider network 100) that can be provided to or read by other components (e.g., the HPO 114), sent to a metrics service 136 at circle (5) that can be accessed by or provided to other components, etc. For example, the metrics pertaining to a particular training step of a training run may be provided to the HPO 114, which at circle may optionally store some or all of these metrics in a metrics store provided by a metrics service 136 (e.g., for tracking the state of the training job and/or tuning job).

At circle (6), upon completion of training according to an objective metric value, the training engine platform 122 stores the trained model(s) 132. Examples of objective metric values include area under the curve, binary classification error rate, negative log-likelihood, mean absolute error, mean average precision, multiclass classification error rate, negative log-likelihood for multiclass classification, normalized discounted cumulative gain, root mean square error, etc. The HPO 114 may provide the final metric information and training job result to the optimal search space selector engine 116 and/or if additional trainings are required for the ML tuning job, the HPO 114 may again continue the procedure by asking for an additional set of hyperparameters and continuing on for a new training job at circle and so on until the tuning job is completed.

Figure 2:
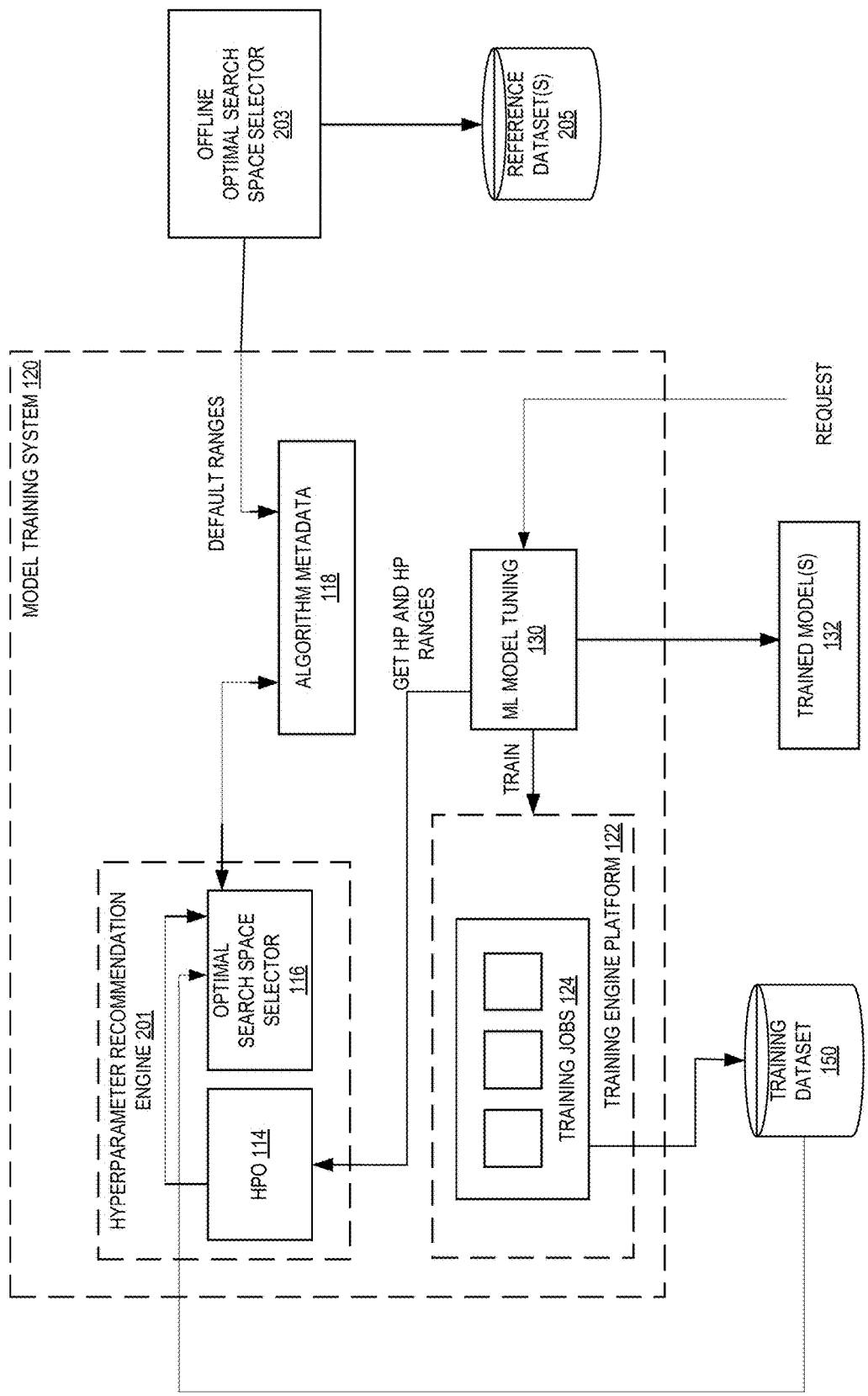
FIG. 2 is a diagram illustrating an environment for finding optimal search spaces and tuning ML models according to some embodiments.

FIG. 2 is a diagram illustrating an environment for finding optimal search spaces and tuning ML models according to some embodiments. FIG. 2 includes a model training system 120 that may be implemented as part of a machine learning service 112 provided by a provider network 100. The model training system 120 may be implemented using software, hardware, or a combination of both. Embodiments of the model training system 120 were discussed with respect to FIG. 1.

An offline optimal search space selector 203 utilizes one or more reference dataset(s) 205 to generate default HP range algorithm metadata 118 for a particular ML algorithm. In general, the offline range selector 203 looks at previous optimal solutions for the particular ML algorithm to determine what HPs were used.

As detailed above, a request comes in to the ML model tuning workflow 130 which coordinates the training of an algorithm by running one or more training jobs 124 using the training engine platform 122 using a training dataset 150 to generate one or more trained model(s) 132. The ML model tuning workflow 130 also asks the HPO 144 and via the HPO 114 the range selector for HPs to use and ranges for some of those HPs. In some embodiments, a HP recommendation engine 201 includes the HPO 114 and the optimal search space selector 116. The HPO 114 asks the optimal search space selector 116 for values to use from algorithm metadata 118. These values may include default values derived from previous tasks of the model, ranges derived from a training dataset 150, and/or a merge of the two range types. Details of how the optimal search space selector 116 and/or offline optimal search space selector 203 determine what optimal search spaces to use are discussed in more detail below.

Figure 3:
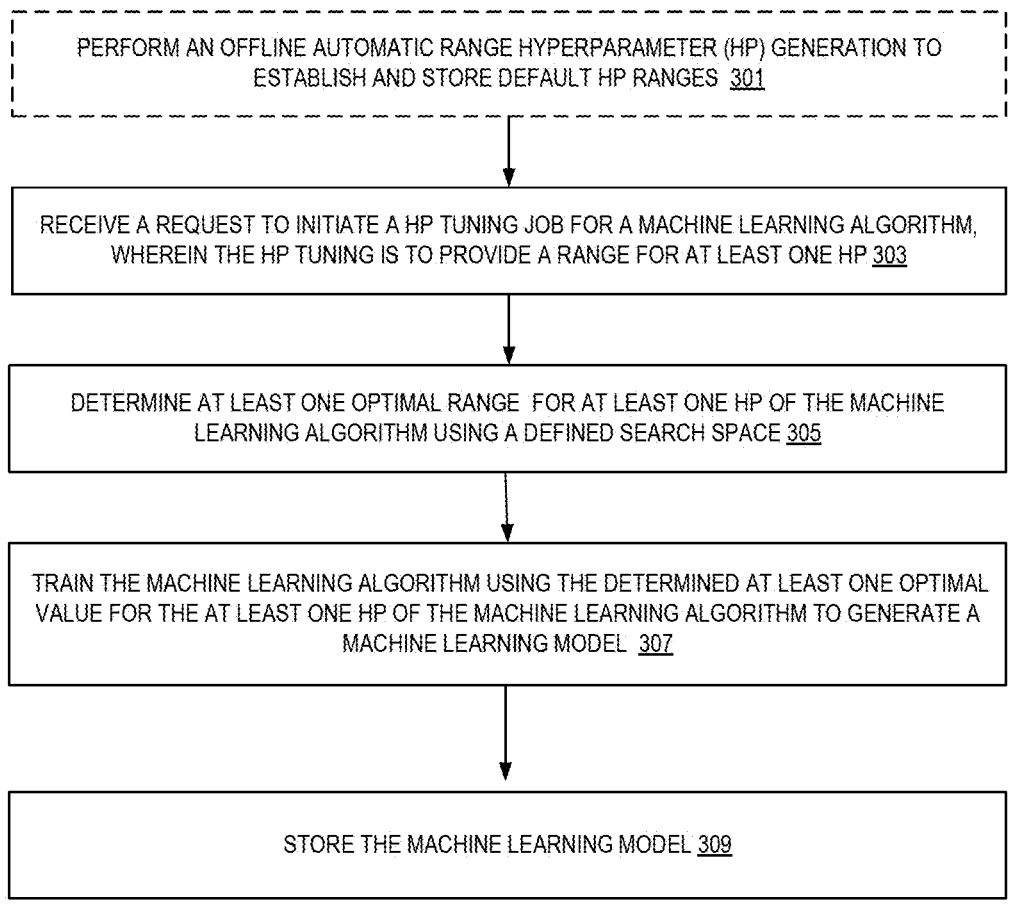
FIG. 3 is a flow diagram illustrating operations of a method using automatic optimal search space determination for an HP in tuning a ML algorithm according to some embodiments.

FIG. 3 is a flow diagram illustrating operations of a method using automatic optimal search space determination for an HP in tuning a ML algorithm according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

In some embodiments, an offline automatic optimal search space generation is performed to establish and store default HP ranges at 301. For example, the offline optimal search space selector 203 is activated to determine "default" values for HP values for a ML algorithm based off of one or more reference dataset(s) 205 (HP values from previous ML algorithm trainings).

At 303, a request to initiate a HP tuning job for a machine learning algorithm is received. For example, a request as noted above is received by the ML tuning workflow 130. This request includes at least some HPs where a search space is to be automatically decided.

Figure 4:
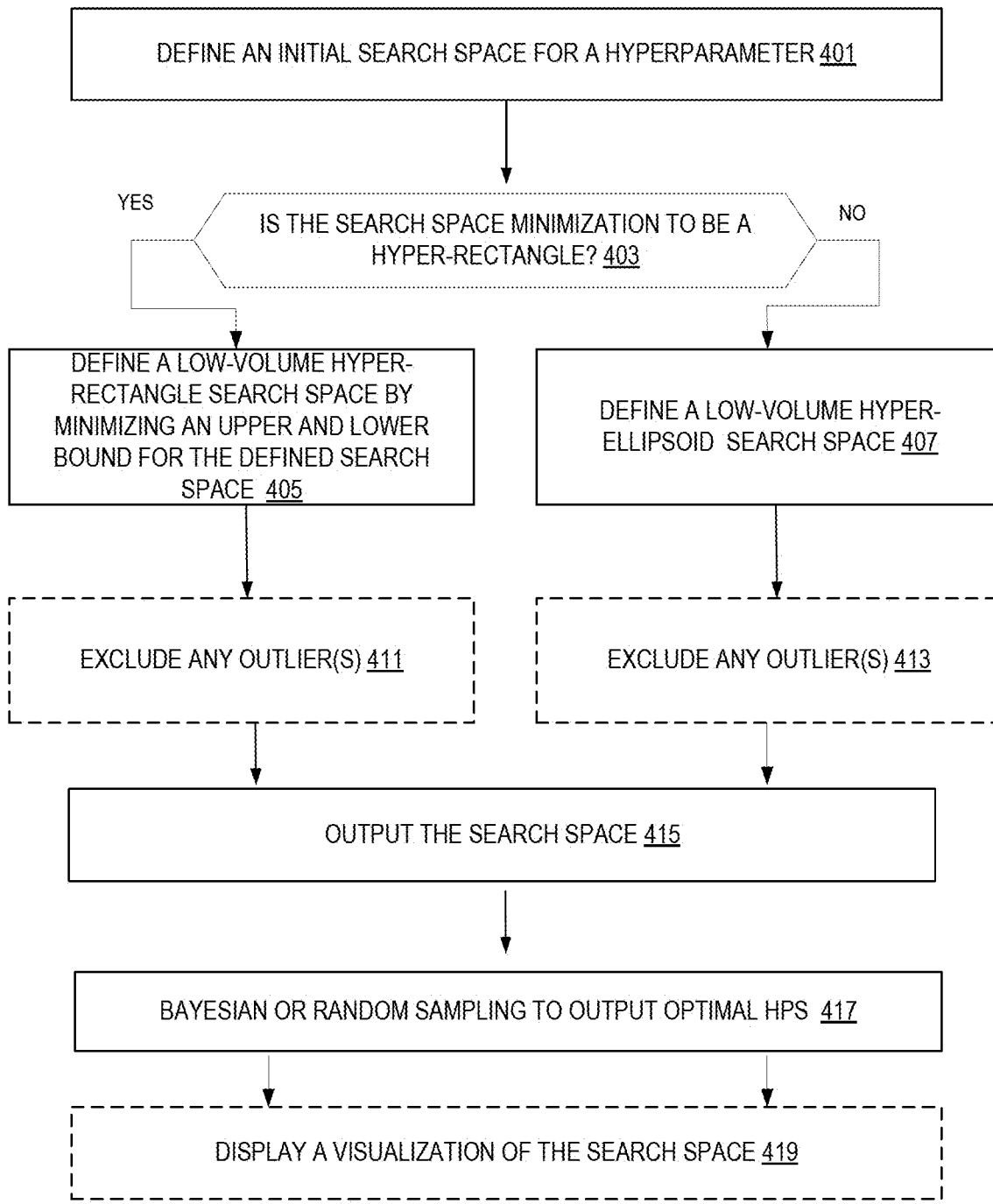
FIG. 4 is a flow diagram illustrating operations of a method using automatic optimal search space determination for an HP in tuning a ML algorithm according to some embodiments.

A HP tuning job is initiated to determine at least one optimal range for at least one HP of the machine learning algorithm using a defined search space at 305. FIG. 4 illustrates more detailed embodiments of this operation.

The machine learning algorithm is trained using the determined at least one optimal HP value for the at least one HP of the machine learning algorithm to generate a machine learning model at 307.

The machine learning model is stored at 309.

FIG. 4 is a flow diagram illustrating operations of a method using automatic optimal search space determination for an HP in tuning a ML algorithm according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

Prior to discussing individual operations, a few exemplary definitions are detailed. For each task t, $(x^*_t, y^*_t)$ are defined such that that $x^*_t$ is the optimal HP and $y^*$ is the corresponding metric associated to the optimal hyperparameter. A search space is parameterized as $\hat{X} = \hat{X}(\theta)$ by a k-dimensional vector $(\theta \in \mathbb{R}^k)$.

To estimate this search space based on data of related tasks (such as the same machine learning algorithm on different datasets), one can view this as an optimization problem such as:

$$\min_{\theta \in \mathbb{R}^k} Q(\theta)$$
$$\text{for } t \geq 1, x^*_t \in \hat{X}(\theta)$$

In short, the goal of this optimization is to find a search space parameterized by $\theta$ containing the best configurations (HPs) $\{x^*_t\}_{t=1}^T$ of the previous tasks while exhibiting particular properties of interest. This defines an initial search space for one or more hyperparameter at 401.

In some embodiments, at 403, a determination is made of if the search space is to be minimized using a low-volume hyper-rectangle or as low-volume hyper-ellipsoid. This determination occurs if there are options as to what shape to use. In some embodiments, only one type is supported, and the other illustrated path does not exist. Note the type of search space may be defined in the tuning request.

At 405, when the search space is a low-volume hyper-rectangle, it is defined by minimizing an upper and lower bound for the search space that includes $\{x^*_t\}_{t=1}^T$. In other words, the search space is the smallest shaped box that includes all of the HP values from a previous evaluation and/or from a user dataset. This may be defined as follows (where u and l represent upper and lower bounds):

$$\min_{1 \in \mathbb{R}^P, u \in \mathbb{R}^P} \frac{1}{2} \|u - 1\|_2^2.$$
$$\text{for } t \geq 1, 1 \leq x^*_t \leq u$$

In some embodiments, any outlier(s) of the low-volume hyper-rectangle are excluded at 411. An example of defining this removal is as follows wherein $\lambda$ is a regularization parameter:

$$\min_{1 \in \mathbb{R}^P, u \in \mathbb{R}^P, \xi^-_t \geq 0, \xi^+_t \geq 0} \frac{\lambda_b}{2} \|u - 1\|_2^2 + \frac{1}{2T} \sum_{t=1}^T (\xi^-_t + \xi^+_t).$$
$$\text{for } t \geq 1, 1 - \xi^-_t |1_0| \leq x^*_t \leq u + \xi^+_t |u_0|$$

In some embodiments, the definition of the low-volume hyper-rectangle includes the exclusion of the outlier(s). As such, 405 and 411 are combined.

At 407, when the search space is a low-volume hyper-ellipsoid it again covers the $\{x^*_t\}_{t=1}^T$. In other words, the search space is the smallest hyper-ellipsoid that includes all of the HP values from a previous evaluation and/or from a user dataset. In some embodiments, the Lowner-John convex formulation is used to define the shape:

$$\min_{\substack{A \in \mathbb{R}^{p \times p}, A > 0, b \in \mathbb{R}^p \\ \text{for } t \geq 1, \|Ax^*_t + b\|_2 \leq 1}} \text{logdet}(A^{-1}).$$

In some embodiments, any outlier(s) of the low-volume hyper-rectangle are excluded at 413. An example of defining this removal is as follows wherein $\lambda$ is a regularization parameter:

$$\min_{\substack{A \in \mathbb{R}^{p \times p}, A > 0, b \in \mathbb{R}^p, \xi_t \geq 0 \\ \text{for } t \geq 1, \|Ax^*_t + b\|_2 \leq 1 + \xi_t}} \lambda_e \text{logdet}(A^{-1}) + \frac{1}{T} \sum_{t=1}^T \xi_t.$$

In some embodiments, the definition of the low-volume hyper-ellipsoid includes the exclusion of the outlier(s). As such, 407 and 413 are combined.

At 415, the search space is output. For a hyper-rectangle, this may include determining an upper range value and a lowest range value for each HP from the hyper-rectangle and outputting these values.

The search space is sampled at 417 to determine and output optimal HPs. For example, a Bayesian search or (uniform) random sampling is performed.

At 419, the search space visualization is displayed in some embodiments. In some embodiments, this display is in the form of a plot as shown in FIGS. 7A-D.

Figure 5:
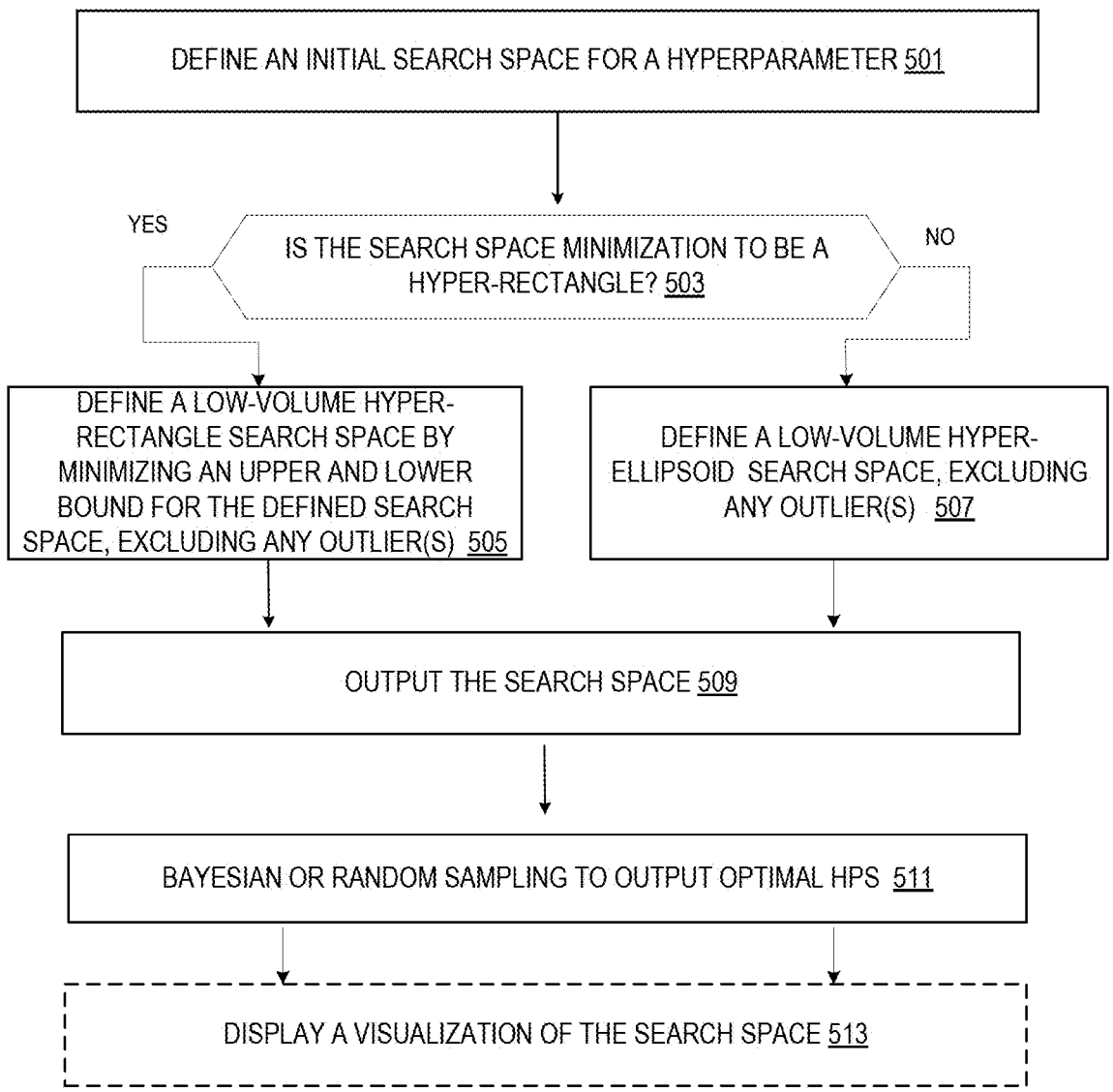
FIG. 5 is a flow diagram illustrating operations of a method using search space determination for an HP in tuning a ML algorithm according to some embodiments.

FIG. 5 is a flow diagram illustrating operations of a method using automatic optimal search space determination for an HP in tuning a ML algorithm according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

Prior to discussing individual operations, a few exemplary definitions are detailed. For each task t, $(x^*_t, y^*_t)$ are defined such that that $x^*_t$ is the optimal HP and $y^*$ optimal HP values is the corresponding metric associated to the optimal hyperparameter. A search space is parameterized as $\hat{X} = \hat{X}(\theta)$ by a k-dimensional vector ($\theta \in \mathbb{R}^k$).

To estimate this search space based on data of related tasks such as the same machine learning algorithm on different datasets, one can view this as an optimization problem such as:

$$\min_{\theta \in \mathbb{R}^k} Q(\theta)$$
$$\text{for } t \geq 1, x^*_t \in \hat{X}(\theta)$$

In short, the goal of this optimization is to find a search space parameterized by $\theta$ containing the best configurations (HPs) $\{x^*_t\}_{t=1}^T$ of the previous tasks while exhibiting particular properties of interest. This defines an initial search space for one or more hyperparameter at 501.

In some embodiments, at 503, a determination is made of if the search space is to be minimized using a low-volume hyper-rectangle or as low-volume hyper-ellipsoid. This determination occurs if there are options as to what shape to use. In some embodiments, only one type is supported, and the other illustrated path does not exist. Note the type of search space may be defined in the tuning request.

At 505, when the search space is a low-volume hyper-rectangle, it is defined by minimizing an upper and lower bound for the search space that includes $\{x^*_t\}_{t=1}^T$. In other words, the search space is the smallest shaped box that includes all of the HP values from a previous evaluation and/or from a user dataset. This may be defined as follows (where u and 1 represent upper and lower bounds):

$$\min_{\substack{1 \in \mathbb{R}^p, u \in \mathbb{R}^p \\ \text{for } t \geq 1, 1 \leq x^*_t \leq u}} \frac{1}{2} \|u - 1\|_2^2.$$

Any outlier(s) of the low-volume hyper-rectangle are excluded. An example of defining this removal is as follows wherein $\lambda$ is a regularization parameter:

$$\min_{\substack{1 \in \mathbb{R}^p, u \in \mathbb{R}^p, \xi_t^- \geq 0, \xi_t^+ \geq 0 \\ \text{for } t \geq 1, 1 - \xi_t^- |1_0| \leq x^*_t \leq u + \xi_t^+ |u_0|}} \frac{\lambda_b}{2} \|u - 1\|_2^2 + \frac{1}{2T} \sum_{t=1}^T (\xi_t^- + \xi_t^+).$$

At 507, when the search space is a low-volume hyper-ellipsoid it again covers the $\{x^*_t\}_{t=1}^T$. In other words, the search space is the smallest hyper-ellipsoid that includes all of the HP values from a previous evaluation and/or from a user dataset. In some embodiments, the Lowner-John convex formulation is used to define the shape:

$$\min_{\substack{A \in \mathbb{R}^{p \times p}, A > 0, b \in \mathbb{R}^p \\ \text{for } t \geq 1, \|Ax^*_t + b\|_2 \leq 1}} \text{logdet}(A^{-1}).$$

Any outlier(s) of the low-volume hyper-rectangle are excluded at 513. An example of defining this removal is as follows wherein $\lambda$ is a regularization parameter:

$$\min_{\substack{A \in \mathbb{R}^{p \times p}, A > 0, b \in \mathbb{R}^p, \xi_t \geq 0 \\ \text{for } t \geq 1, \|Ax^*_t + b\|_2 \leq 1 + \xi_t}} \lambda_e \text{logdet}(A^{-1}) + \frac{1}{T} \sum_{t=1}^T \xi_t.$$

At 509, the search space is output. For a hyper-rectangle, this may include determining an upper range value and a lowest range value for each HP from the hyper-rectangle and outputting these values.

The search space is sampled at 511 to determine and output optimal HPs. For example, a Bayesian search or (uniform) random sampling is performed.

At 513, the search space visualization is displayed in some embodiments. In some embodiments, this display is in the form of a plot as shown in FIGS. 7A-D.

FIG. 6 illustrates an example of a portion of tuning job configuration. In this portion, there are examples of ranges for an HP such as 601, an example of when the range needs to be found 603, and the objective 605.

Figure 7A:
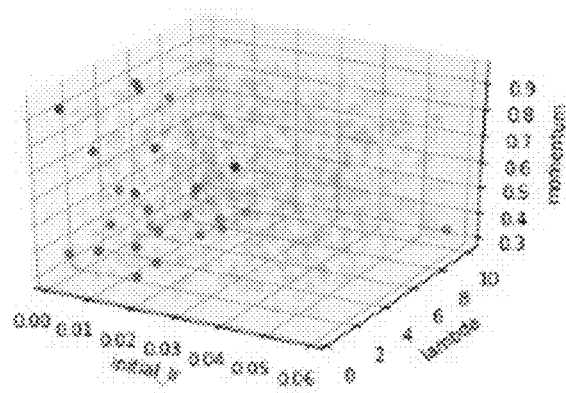
FIGS. 7A-D illustrate examples of observed HP values.

FIGS. 7A-D illustrate examples of observed HP values. FIG. 7A illustrates an example of using a hyper-rectangle. The darker dots are the observed evaluations and the ligher dots are the samples drawn from the learned box. Note the rough box like shape in the lighter dots.

Figure 7B:
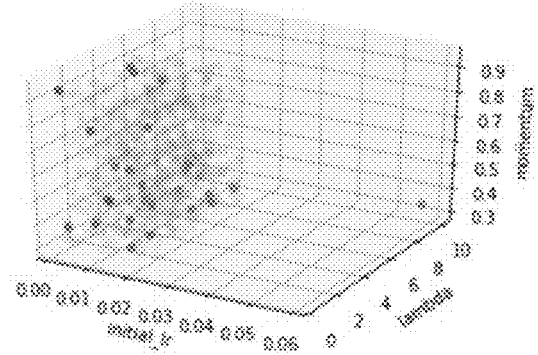

FIG. 7B illustrates an example of using a hyper-rectangle that has eliminated an outlier. In particular, the outlier on the far right has been removed from consideration along with all samples drawn from the learned box that are outside of the observed evaluations.

Figure 7C:
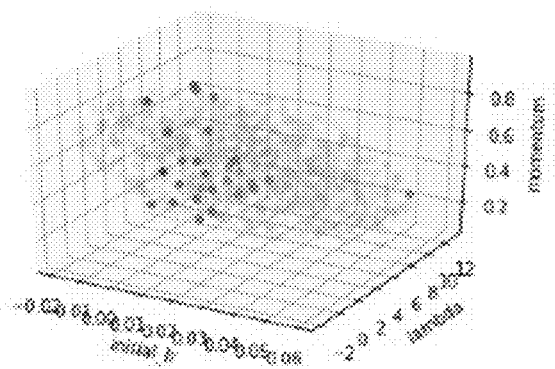

FIG. 7C illustrates an example of using a hyper-ellipsoid. Again, the darker dots are the observed evaluations and the lighter dots are the samples drawn from the learned box. Note the rough hyper-ellipsoid like shape in the lighter dots.

Figure 7D:
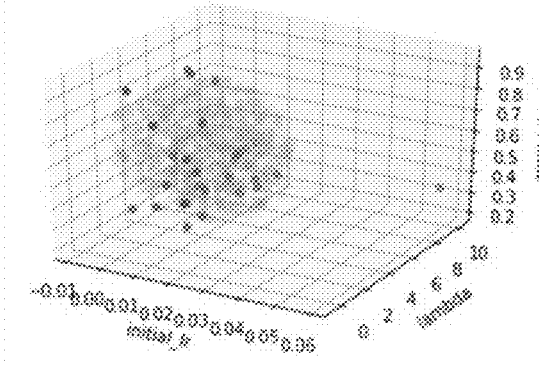

FIG. 7D illustrates an example of using a hyper-ellipsoid that has eliminated an outlier. In particular, the outlier on the far right has been removed from consideration along with all samples drawn from the learned hyper-ellipsoid that are outside of the observed evaluations.

Figure 8:
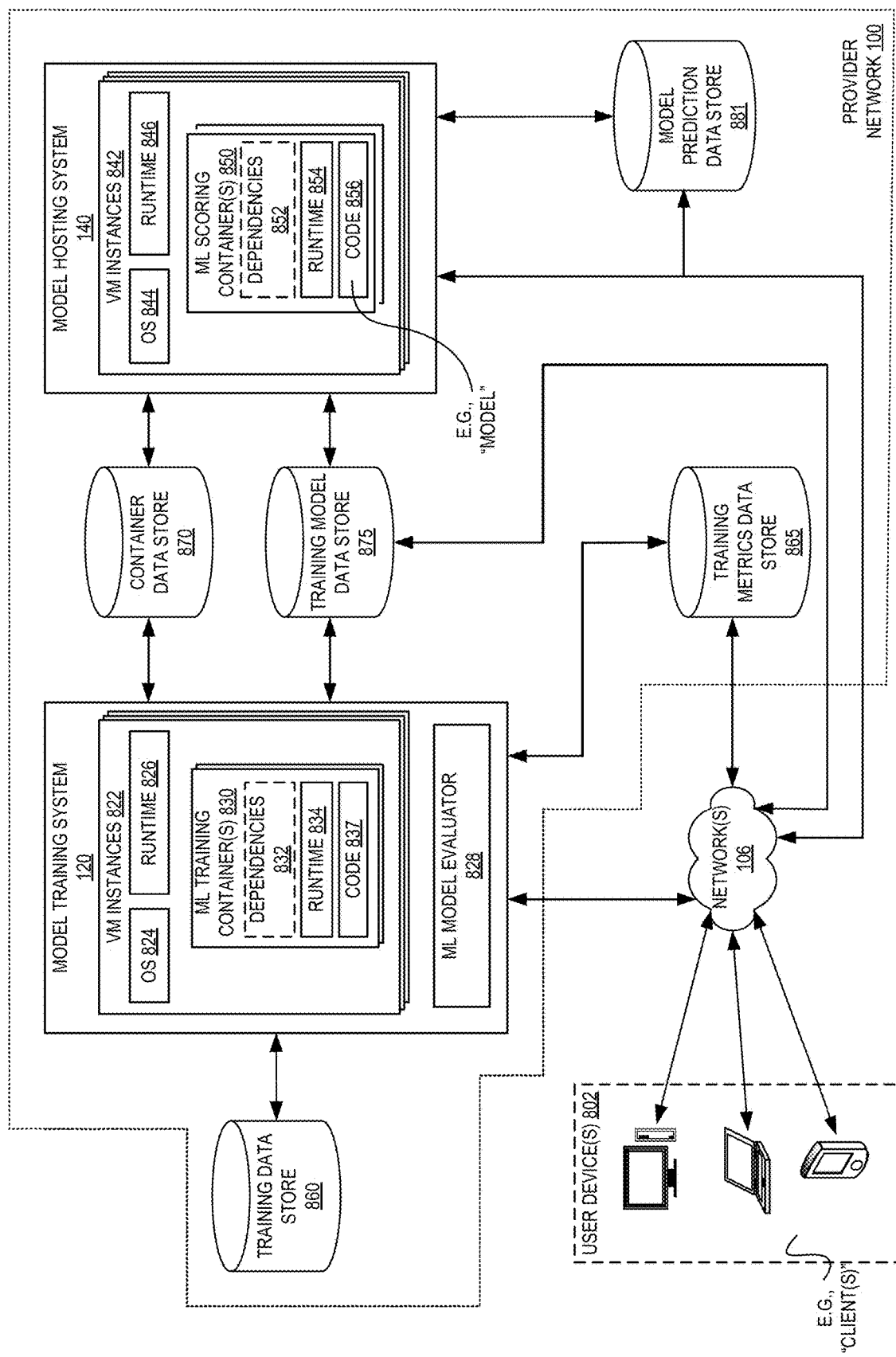
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802 (for example, electronic devices(s) 120), a model training system 120, a model hosting system 140, a training data store 860, a training metrics data store 865, a container data store 870, a training model data store 875, and a model prediction data store 881.

A machine learning service described herein may include one or more of these entities, such as the model hosting system 140, model training system 120, and so forth.

In some embodiments, users, by way of user devices 802, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 802 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 802 can interact with the model training system 120 via frontend 829 of the model training system 120. For example, a user device 802 can provide a training request to the frontend 829 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 802, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 802 may provide, in the training request, an algorithm written in any programming language. The model training system 120 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 120 can retrieve the container image from the indicated location and create a container using the retrieved container image. The container is then loaded into a virtual machine instance 822 for training a machine learning model, as described in greater detail below.

The model training system 120 can use the information provided by the user device 802 to train a machine learning model in one or more pre-established virtual machine instances 822 in some embodiments. In particular, the model training system 120 includes a single physical computing device or multiple physical computing devices that are interconnected using one or more computing networks (not shown), where the physical computing device(s) host one or more virtual machine instances 822. The model training system 120 can handle the acquisition and configuration of compute capacity (for example, containers, instances, etc., which are described in greater detail below) based on the information describing the computing machine on which to train a machine learning model provided by the user device 802. The model training system 120 can then train machine learning models using the compute capacity, as is described in greater detail below. The model training system 120 can automatically scale up and down based on the volume of training requests received from user devices 802 via frontend 829, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (for example, task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training. Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 120 uses one or more container images included in a training request (or a container image retrieved from the container data store 870 in response to a received training request) to create and initialize a ML training container 830 in a virtual machine instance 822. For example, the model training system 120 creates a ML training container 830 that includes the container image(s) and/or a top container layer.

Prior to beginning the training process, in some embodiments, the model training system 120 retrieves training data from the location indicated in the training request. For example, the location indicated in the training request can be a location in the training data store 860. Thus, the model training system 120 retrieves the training data from the indicated location in the training data store 860. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 120 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 120 as input parameters to some or all of the instructions being executed.

In some embodiments, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 120 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 120 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 120 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 120 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 120 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 120 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 802, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 120 can cause the virtual machine instance 822 to modify the execution of code stored in an existing ML training container 830 according to the data provided in the modification request. In some embodiments, the user, via the user device 802, can transmit a request to the model training system 120 to stop the machine learning model training process. The model training system 120 can then instruct the virtual machine instance 822 to delete the ML training container 830 and/or to delete any model data stored in the training model data store 875.

As described below, in some embodiments, the model data stored in the training model data store 875 is used by the model hosting system 140 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 140, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 842. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 802 via frontend 849 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (for example, task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some embodiments. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 140 uses one or more container images included in a deployment request (or a container image retrieved from the container data store 870 in response to a received deployment request) to create and initialize a ML scoring container 850 in a virtual machine instance 842. For example, the model hosting system 140 creates a ML scoring container 850 that includes the container image(s) and/or a top container layer.

As described above, a user device 802 can submit a deployment request and/or an execution request to the model hosting system 140 via the frontend 849 in some embodiments. A deployment request causes the model hosting system 140 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 140 initializes ones or more ML scoring containers 850 in one or more hosted virtual machine instance 842. In embodiments in which the deployment request includes an identification of one or more container images, the model hosting system 140 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 140 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 140 retrieves the identified model data file from the training model data store 875 and inserts the model data file into a single ML scoring container 850, which forms a portion of code 856. In some embodiments, the model data file is archived or compressed (for example, formed from a package of individual files). Thus, the model hosting system 140 unarchives or decompresses the model data file to obtain multiple individual files and inserts the individual files into the ML scoring container 850. In some embodiments, the model hosting system 140 stores the model data file in the same location as the location in which the model data file was stored in the ML training container 830 that generated the model data file. For example, the model data file initially was stored in the top container layer of the ML training container 830 at a certain offset, and the model hosting system 140 then stores the model data file in the top container layer of the ML scoring container 850 at the same offset.

In embodiments in which multiple model data files are identified in the deployment request, the model hosting system 140 retrieves the identified model data files from the training model data store 875. The model hosting system 140 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 850 with the endpoint identified in the deployment request. For example, each of the initialized ML scoring container(s) 850 can be associated with a network address. The model hosting system 140 can map the network address(es) to the identified endpoint, and the model hosting system 140 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 140 via the frontend 849, where the execution request identifies an endpoint and includes an input to a machine learning model (for example, a set of input data). The model hosting system 140 or another system (for example, a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 140 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 881. Alternatively or in addition, the virtual machine instance 842 transmits the output to the user device 802 that submitted the execution result via the frontend 849.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 881 and/or the user device 802 via the frontend 849 (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 120, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 8 are not meant to be limiting. For example, the model training system 120 and/or the model hosting system 140 could also operate within a computing environment having a fewer or greater number of devices than are illustrated in FIG. 8. Thus, the depiction of the model training system 120 and/or the model hosting system 140 in FIG. 8 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 829 processes all training requests received from user devices 802 and provisions virtual machine instances 822. In some embodiments, the frontend 829 serves as a front door to all the other services provided by the model training system 120. The frontend 829 processes the requests and makes sure that the requests are properly authorized. For example, the frontend 829 may determine whether the user associated with the training request is authorized to initiate the training process.

Similarly, frontend 849 processes all deployment and execution requests received from user devices 802 and provisions virtual machine instances 842. In some embodiments, the frontend 849 serves as a front door to all the other services provided by the model hosting system 140. The frontend 849 processes the requests and makes sure that the requests are properly authorized. For example, the frontend 849 may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 120 and the model hosting system 140, this is not meant to be limiting. For example, in some embodiments not shown, the training data store 860 is located internal to at least one of the model training system 120 or the model hosting system 140.

In some embodiments, the training metrics data store 865 stores model metrics. While the training metrics data store 865 is depicted as being located external to the model training system 120 and the model hosting system 140, this is not meant to be limiting. For example, in some embodiments not shown, the training metrics data store 865 is located internal to at least one of the model training system 120 or the model hosting system 140.

The container data store 870 stores container images, such as container images used to form ML training containers 830 and/or ML scoring containers 850, that can be retrieved by various virtual machine instances 822 and/or 842. While the container data store 870 is depicted as being located external to the model training system 120 and the model hosting system 140, this is not meant to be limiting. For example, in some embodiments not shown, the container data store 870 is located internal to at least one of the model training system 120 and the model hosting system 140.

The training model data store 875 stores model data files. In some embodiments, some of the model data files are comprised of a single file, while other model data files are packages of multiple individual files. While the training model data store 875 is depicted as being located external to the model training system 120 and the model hosting system 140, this is not meant to be limiting. For example, in some embodiments not shown, the training model data store 875 is located internal to at least one of the model training system 120 or the model hosting system 140.

The model prediction data store 881 stores outputs (for example, execution results) generated by the ML scoring containers 850 in some embodiments. While the model prediction data store 881 is depicted as being located external to the model training system 120 and the model hosting system 140, this is not meant to be limiting. For example, in some embodiments not shown, the model prediction data store 881 is located internal to at least one of the model training system 120 and the model hosting system 140.

While the model training system 120, the model hosting system 140, the training data store 860, the training metrics data store 865, the container data store 870, the training model data store 875, and the model prediction data store 881 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 802 with one or more user interfaces, command-line interfaces (CLI), application programming interfaces (API), and/or other programmatic interfaces for submitting training requests, deployment requests, and/or execution requests. In some embodiments, the user devices 802 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
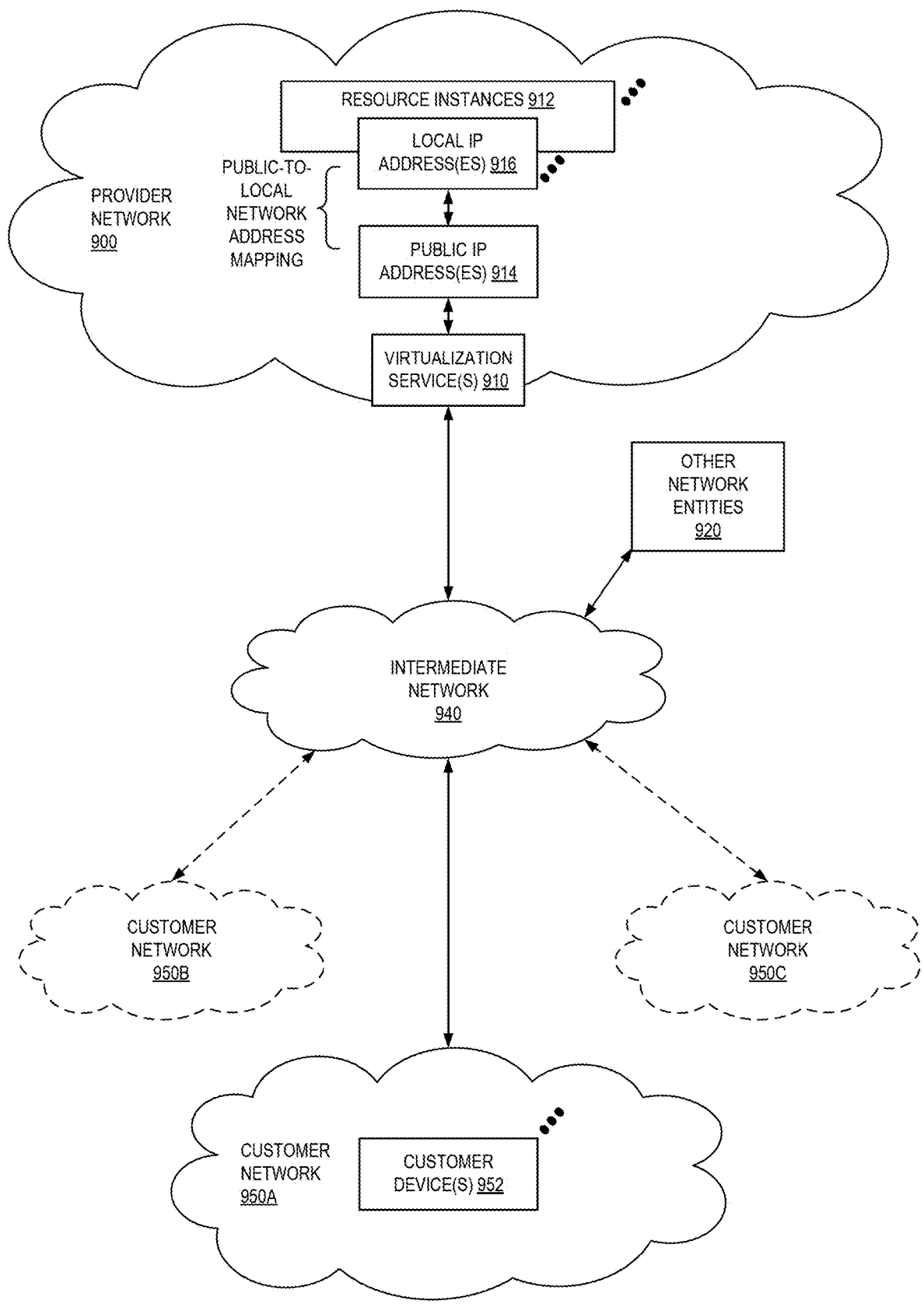
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
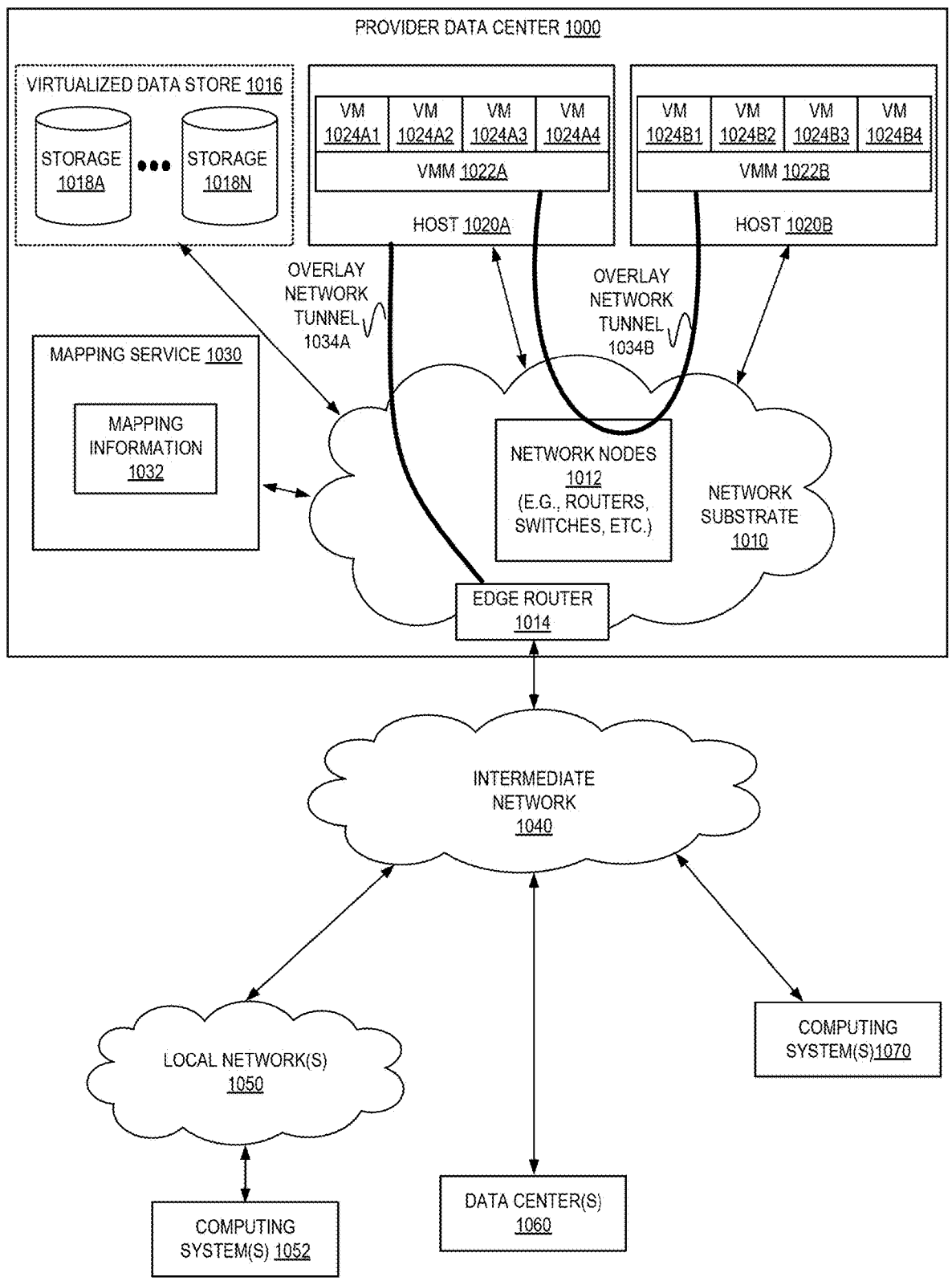
FIG. 10 illustrates an example data center that implements an overlay network on a network substrate using IP tunneling technology according to some embodiments.

FIG. 10 illustrates an example data center that implements an overlay network on a network substrate using IP tunneling technology, according to some embodiments. A provider data center 1000 may include a network substrate that includes networking nodes 1012 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the local IP addresses). Packets in the overlay layer may be checked against a mapping directory (e.g., provided by mapping service 1030) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1030) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A (of VMs 1024A1-1024A4, via VMM 1022A) on host 1020A to a device on the intermediate network 1050 and an example overlay network tunnel 1034B between a VM 1024A (of VMs 1024A1-1024A4, via VMM 1022A) on host 1020A and a VM 1024B (of VMs 1024B1-1024B4, via VMM 1022B) on host 1020B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be executed in slots on the hosts 1020 that are rented or leased to customers of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more local IP addresses; the VMM 1022 on a host 1020 may be aware of the local IP addresses of the VMs 1024 on the host. A mapping service 1030 may be aware of (e.g., via stored mapping information 1032) network IP prefixes and IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to some embodiments. The provider data center 1000 may, for example, provide customers the ability to implement virtual computing systems (VMs 1024) via a hardware virtualization service and the ability to implement virtualized data stores 1016 on storage resources 1018A-1018N via a storage service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1018A-1018N, as virtualized resources to customers of a network provider in a similar manner.

Figure 11:
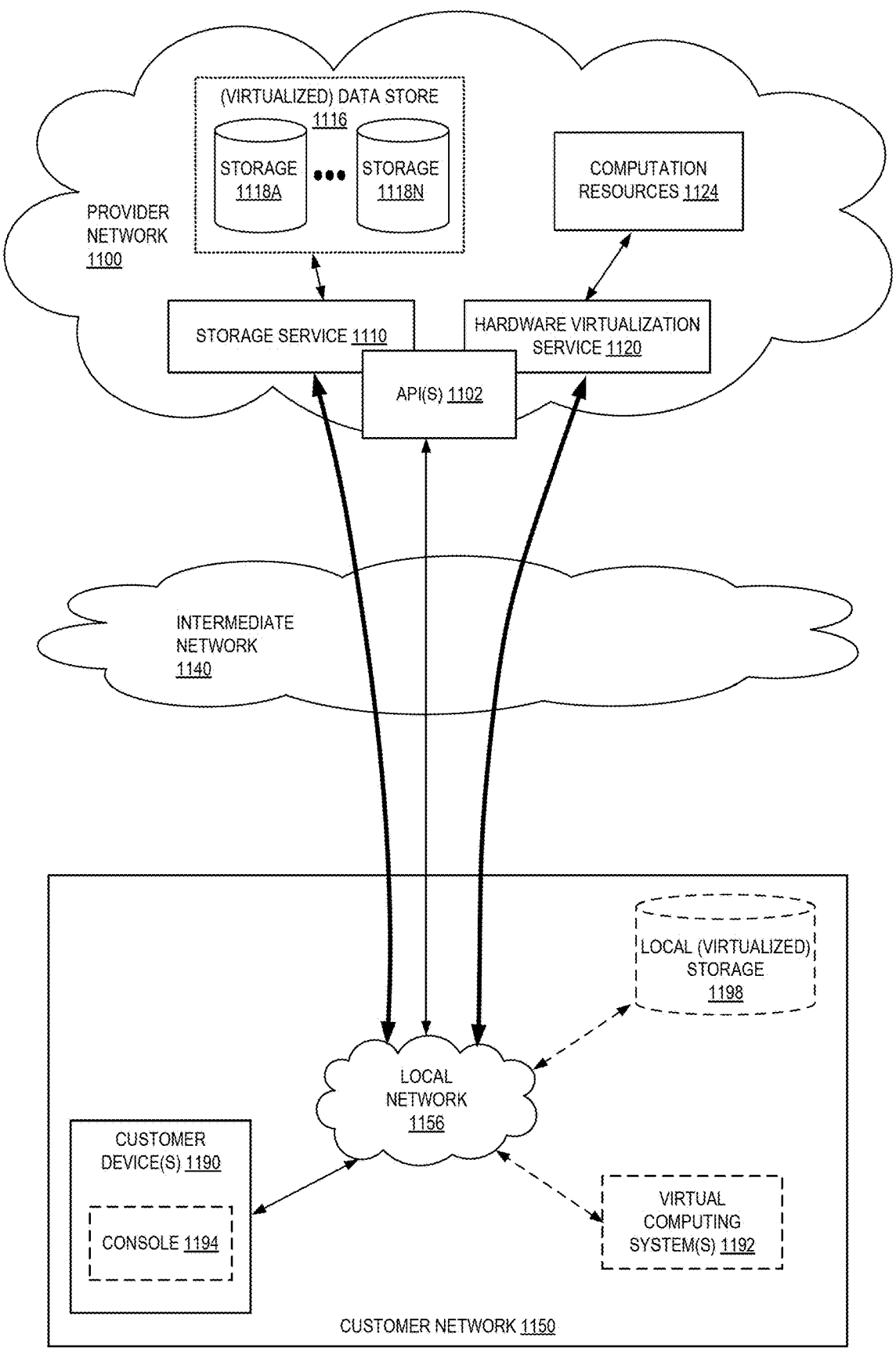
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
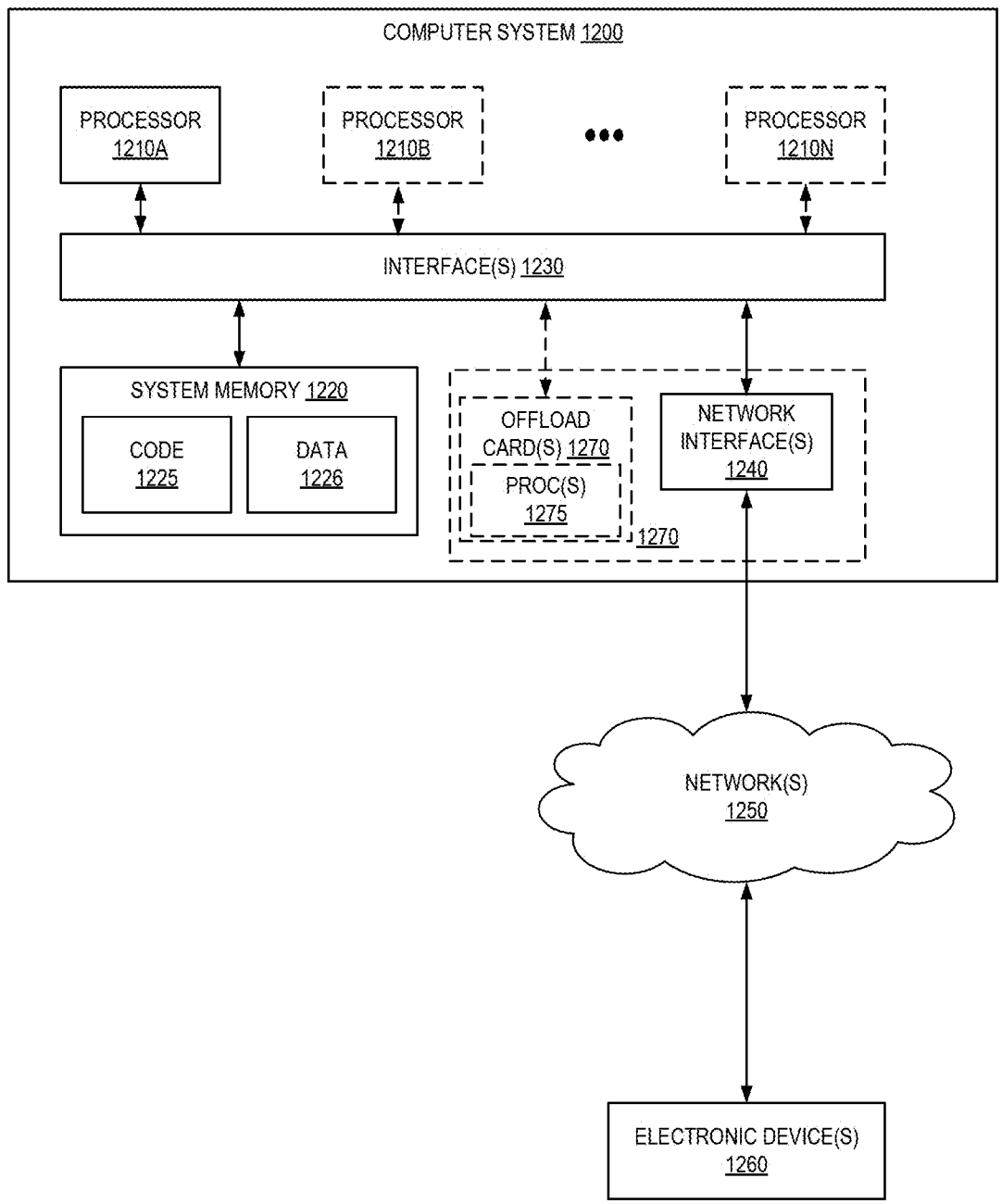
FIG. 12 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
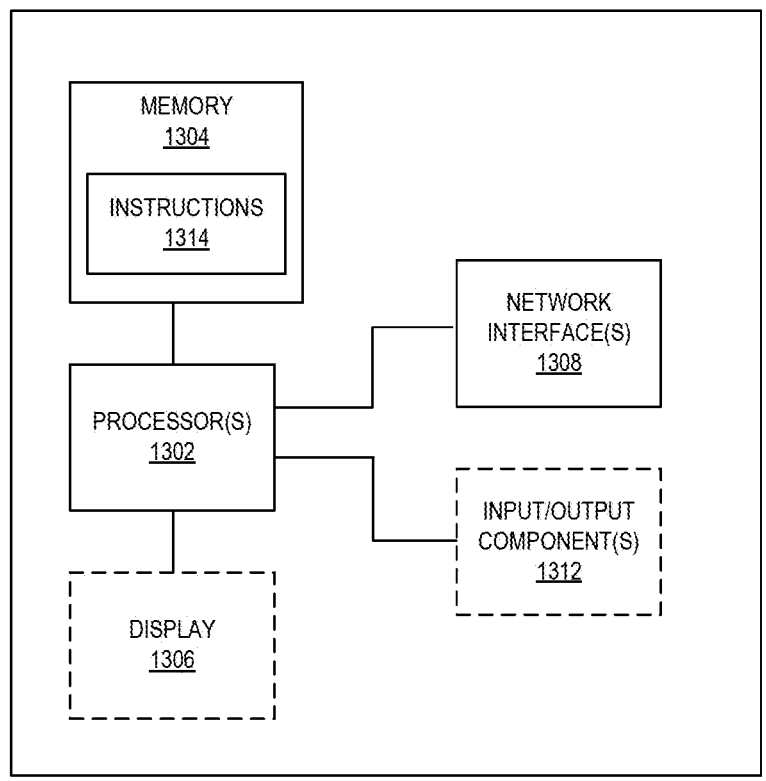
FIG. 13 illustrates a logical arrangement of a set of general components of an exemplary computing device that can be utilized in accordance with various embodiments.

FIG. 13 illustrates a logical arrangement of a set of general components of an example computing device 1300 such as those detailed above, etc. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (e.g., instructions 1314) and/or data, and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1314) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
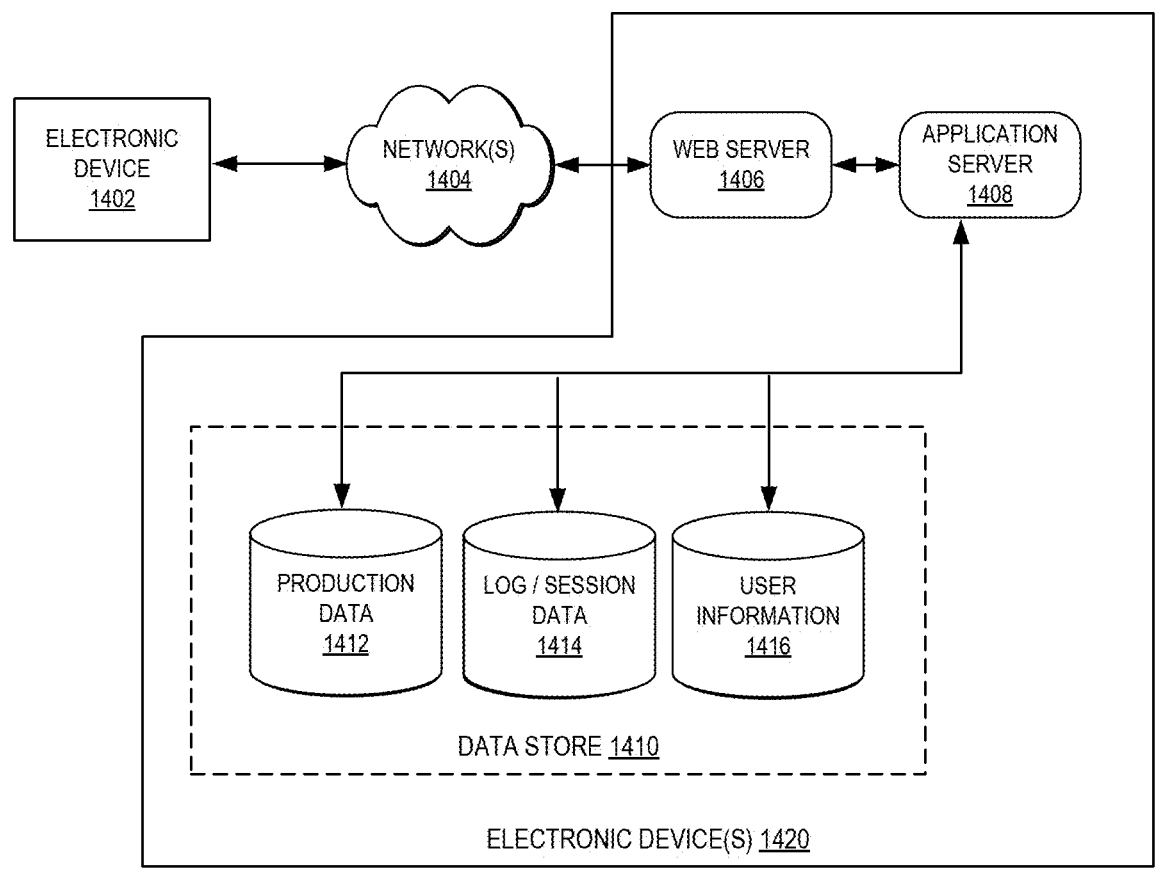
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments the requests are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to determine a search space for at least one hyperparameter of a machine learning algorithm;
   determining, according to the request, optimal hyperparameter values from the search space for the at least one hyperparameter of the machine learning algorithm based on an evaluation of hyperparameters from the machine learning algorithm on different datasets, wherein the determining comprises:
      defining the search space for the at least one hyperparameter, excluding any outliers;
      defining a hyper-rectangle by minimizing an upper and lower bound for the defined search space that at least includes hyperparameters from the machine learning algorithm on different datasets;
      determining an upper range value and a lowest range value from the hyper-rectangle;
      outputting the upper and lowest range values; and
      performing one of sampling the upper and lowest range values, or Bayesian optimizing the upper and lowest range values, to determine the optimal hyperparameter values; and
   tuning the machine learning algorithm using the optimal hyperparameter values for the at least one hyperparameter of the machine learning algorithm to generate a machine learning model.

2. The computer-implemented method of claim 1, wherein excluding any outliers comprises excluding any outliers of the hyper-rectangle prior to determining the upper range value and the lowest range value.

3. The computer-implemented method of claim 1, wherein the hyper-rectangle includes previously derived default range values and user provided hyperparameter values.

4. A computer-implemented method comprising:
   receiving a request to determine a search space for at least one hyperparameter of a machine learning algorithm;

determining, according to the request, optimal hyperparameter values from the search space for the at least one hyperparameter of the machine learning algorithm based on an evaluation of hyperparameters from the machine learning algorithm on different datasets, wherein the determining comprises:
  defining the search space for the at least one hyperparameter, excluding any outliers;
  defining a hyper-ellipsoid that includes hyperparameters from the machine learning algorithm on different datasets; and
  performing one of sampling the upper and lowest range values, or Bayesian optimizing the upper and lowest range values, to determine the optimal hyperparameter values; and
tuning the machine learning algorithm using the optimal hyperparameter values for the at least one hyperparameter of the machine learning algorithm to generate a machine learning model.

5. The computer-implemented method of claim 4, wherein the search space includes previously derived default range hyperparameter values and a user provided search space.

6. The computer-implemented method of claim 4, further comprising displaying the search space of hyperparameter values.

7. The computer-implemented method of claim 4, wherein the request includes null values for minimum and maximum values of the at least one hyperparameter, the null values indicating that the minimum and maximum values of the at least one hyperparameter are to be determined from the search space.

8. The computer-implemented method of claim 4, wherein tuning the machine learning algorithm using the optimal hyperparameter values for the at least one hyperparameter of the machine learning algorithm to generate a machine learning model comprises executing a plurality of training jobs using a training dataset to determine a machine learning model to store.

9. The computer-implemented method of claim 8, wherein the machine learning model to store is a model that performs the best as measured by a defined objective metric.

10. A system comprising:
  a training engine platform to tune a machine learning algorithm implemented by a first one or more electronic devices; and
  an optimal hyperparameter selector service implemented by a second one or more electronic devices, the optimal hyperparameter selector service including instructions that upon execution by one or more processors cause the optimal hyperparameter selector service to:
    receive a request to determine a search space for at least one hyperparameter of the machine learning algorithm;
    determine, according to the request, optimal hyperparameter values from the search space for the at least one hyperparameter of the machine learning algorithm based on an evaluation of hyperparameters from the machine learning algorithm on different datasets, wherein the determining comprises:
      defining the search space for the at least one hyperparameter, excluding any outliers;
      defining a hyper-rectangle by minimizing an upper and lower bound for the defined search space that at least includes hyperparameters from the machine learning algorithm on different datasets;
      determining an upper range value and a lowest range value from the hyper-rectangle;
      outputting the upper and lowest range value; and
      performing one of sampling the upper and lowest range values, or Bayesian optimizing the upper and lowest range values, to determine the optimal hyperparameter values; and
    cause the training engine platform to tune the machine learning algorithm using the optimal hyperparameter values for the at least one hyperparameter of the machine learning algorithm to generate a machine learning model.

11. The system of claim 10, wherein excluding any outliers comprises excluding any outliers of the hyper-rectangle prior to determining the upper range value and the lowest range value.

12. The system of claim 10, wherein the search space includes previously derived default range hyperparameter values and a user provided search space.

13. The system of claim 10, wherein the training engine platform is to use the optimal hyperparameter values for the at least one hyperparameter of the machine learning algorithm to generate a machine learning model by an execution of a plurality of training jobs using a training dataset to determine a machine learning model to store.

14. The system of claim 10, further comprising a display to display the search space of hyperparameter values.

15. The computer-implemented method of claim 1, wherein the request includes null values for minimum and maximum values of the at least one hyperparameter, the null values indicating that the minimum and maximum values of the at least one hyperparameter are to be determined from the search space.

16. The computer-implemented method of claim 1, wherein tuning the machine learning algorithm using the optimal hyperparameter values for the at least one hyperparameter of the machine learning algorithm to generate a machine learning model comprises executing a plurality of training jobs using a training dataset to determine a machine learning model to store.

17. A system comprising:
  a training engine platform to tune a machine learning algorithm implemented by a first one or more electronic devices; and
  an optimal hyperparameter selector service implemented by a second one or more electronic devices, the optimal hyperparameter selector service including instructions that upon execution by one or more processors cause the optimal hyperparameter selector service to:
    receive a request to determine a search space for at least one hyperparameter of the machine learning algorithm;
    determine, according to the request, optimal hyperparameter values from the search space for the at least one hyperparameter of the machine learning algorithm based on an evaluation of hyperparameters from the machine learning algorithm on different datasets, wherein the determining comprises:
      defining the search space for the at least one hyperparameter, excluding any outliers;
      defining a hyper-ellipsoid that includes hyperparameters from the machine learning algorithm on different datasets; and
      performing one of sampling the upper and lowest range values, or Bayesian optimizing the upper and lowest range values, to determine the optimal hyperparameter values; and cause the training engine platform to tune the machine learning algorithm using the optimal hyperparameter values for the at least one hyperparameter of the machine learning algorithm to generate a machine learning model.

18. The system of claim 17, wherein the request includes null values for minimum and maximum values of the at least one hyperparameter, the null values indicating that the minimum and maximum values of the at least one hyperparameter are to be determined from the search space.

* * * * *